US007996498B2

(12) United States Patent
Huang

(10) Patent No.: US 7,996,498 B2
(45) Date of Patent: Aug. 9, 2011

(54) METHOD AND APPARATUS FOR OPERATING A HOST COMPUTER IN A NETWORK ENVIRONMENT

(76) Inventor: Evan S Huang, Cupertino, CA (US)

( * ) Notice: Subject to any disclaimer, the term of this patent is extended or adjusted under 35 U.S.C. 154(b) by 107 days.

(21) Appl. No.: 12/471,471

(22) Filed: May 25, 2009

(65) Prior Publication Data

US 2009/0276509 A1    Nov. 5, 2009

Related U.S. Application Data

(62) Division of application No. 11/008,326, filed on Dec. 9, 2004, now Pat. No. 7,555,568.

(60) Provisional application No. 60/548,576, filed on Feb. 28, 2004.

(51) Int. Cl.
*G06F 15/177* (2006.01)
(52) U.S. Cl. .......... 709/220; 709/222; 710/15; 717/174; 717/175; 717/176
(58) Field of Classification Search .......... None
See application file for complete search history.

(56) References Cited

U.S. PATENT DOCUMENTS

| 7,136,951 B2* | 11/2006 | Deng et al. | 710/302 |
|---|---|---|---|
| 7,181,740 B2* | 2/2007 | Purkeypile et al. | 717/176 |
| 7,797,525 B2* | 9/2010 | Lee et al. | 713/2 |
| 2002/0091805 A1* | 7/2002 | Phillips et al. | 709/220 |
| 2004/0095382 A1* | 5/2004 | Fisher et al. | 345/744 |
| 2004/0153539 A1* | 8/2004 | Lyon et al. | 709/224 |
| 2005/0193189 A1* | 9/2005 | Kim | 713/1 |

* cited by examiner

*Primary Examiner* — Eron J Sorrell
(74) *Attorney, Agent, or Firm* — Invent Capture, LLC.; Samuel S. Cho

(57) ABSTRACT

The present invention provides a method and an apparatus that utilize a portable apparatus to operate a host computer in a network environment. The portable apparatus including an operating system and a list of software applications are installed in a removable data storage medium. The basic input/output system (BIOS) of the host computer will directly or indirectly identify the portable apparatus as its boot drive. The host computer immersed in a network environment will further load the operating system in the portable apparatus into its random access semiconductor memory (RAM). In one embodiment of the invention, a hardware profile which contains host and peripheral device-related information is either stored or operatively accessible by the host computer. The operating system is capable of incorporating information from the hardware profile during an OS-loading procedure.

20 Claims, 13 Drawing Sheets

Fig. 1
*Prior Art*
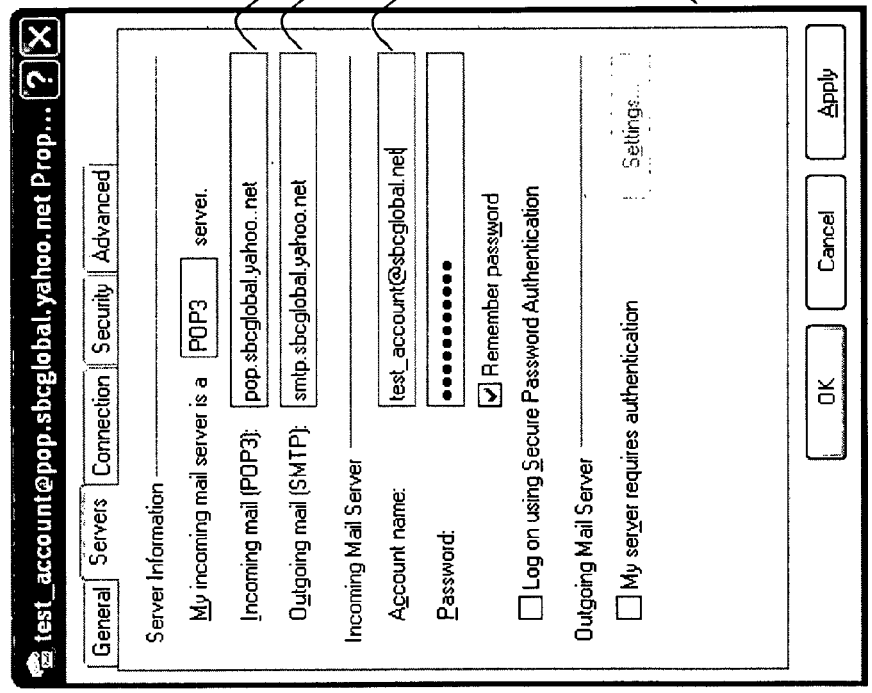

METHOD AND APPARATUS FOR OPERATING A HOST COMPUTER IN A NETWORK ENVIRONMENT

CROSS REFERENCE TO RELATED APPLICATIONS

The present invention is a divisional application from a parent U.S. utility application U.S. Ser. No. 11/008,326 filed on Dec. 9, 2004 and claims priority to the parent US utility application. The parent utility application, U.S. Ser. No. 11/008,326 has received a notice of allowance from the US Patent and Trademark Office on Mar. 9, 2009. The parent US utility application, U.S. Ser. No. 11/008,326, also claims priority to a U.S. provisional application, U.S. 60/548,576, which was filed on Feb. 28, 2004. All of the disclosures contained in U.S. Ser. No. 11/008,326 and U.S. 60/548,576 are incorporated by reference in their entirety for this divisional application.

BACKGROUND OF THE INVENTION

The present invention generally relates to the area of operating a computer system, and more particularly relates to methods and apparatus for operating a host computer from a portable apparatus.

An operating environment with familiar applications is desirable for many computer users. A familiar operating environment may include a set of applications, such as Internet browser, email software, text editor, presentation software, and spreadsheet application, along with parameter settings for those applications, such as home page and favorites for browser, incoming/outgoing accounts for email software, style-sheets for text editor, and templates for presentation and spreadsheet applications. More importantly, a familiar operating environment may also include a set of personal files generated from those applications. Those files are usually valuable and irreplaceable to a computer user. Therefore, how to maintain a consistent operating environment during the modifications of software and/or hardware has been considered as a critical issue.

U.S. Pat. No. 6,438,749 issued to Chamberlain discloses a way to restore a computer to its original state after an unsuccessful software patch. U.S. Pat. No. 6,633,977 issued to Hamilton et al. discloses a duplication process to duplicate the user environment data from the old workstation to the new workstation. Both methods attempt to preserve the software configuration on an identical or similar hardware environment. The disclosed methods do not address how to transport an operating environment among multiple computer systems with different hardware configurations.

U.S. Pub. No. 2003/0110371 to Yang et al. discloses a method to partially maintain a consistent operating environment by utilizing a USB flash memory device to store the user-specific information from a first computer system. The stored information will be temporarily loaded from the USB drive into the same application in a second computer system. This method attempts to transport the personalized computer settings among computer systems with an identical or similar software environment. This method neither discloses how to transport a set of familiar applications among computer systems nor how to transport a set of personal files associated with the applications among computer systems.

A possible approach to maintain a consistent operating environment is to store an operating system along with a list of software applications and personal files in a removable data storage medium, which is then used to operate different computers. This approach can be considered as using a portable apparatus to operate one or more host computers. The portability here not only means the physical mobility of the device but also means the adaptation of the system to operate host computers with different hardware configurations. Accordingly, the host computer needs to be able to boot from the portable apparatus.

An operating system together with a list of software applications and personal files may be burned to a CD-ROM. The ISO 9660 specification, a bootable CD-ROM format, provides new boot capabilities for personal computers. The ISO 9600 specification describes how the BIOS boot procedure can be enhanced to support the CD-ROM using INT 13 calling conventions for enabling the CD-ROM to boot as the "A" drive or "C" drive without device drivers. U.S. Pat. No. 6,122,734 issued to Jeon discloses a bootable CD-ROM disk manufacturing system. The disclosed CD-ROM limits the users' ability to modify or delete the software applications, to install new applications, and to store personal files on the CD-ROM.

U.S. Pat. No. 6,016,402 issued to Thomas et al. discloses a method of integrating a removable media disk drive into an operating system where the removable media disk drive is first recognized as a fixed disk type then recognized as a floppy disk type. U.S. Pat. No. 5,694,600 issued to Khenson et al. discloses an apparatus for booting a computer using a removable medium disk drive. U.S. Pat. No. 6,385,707 issued to Maffezzoni discloses an apparatus for copying files between drives of a computer system including an operating system to create a reliable bootable drive. However, the use of a bootable medium drive in these methods and apparatus is restricted to providing diagnostic support or backup in the event of a system failure, which only requires access to the file system in the internal hard drive of a problematic computer instead of fully operating a computer system and its peripheral devices.

U.S. Pat. No. 6,170,055 issued to Meyer et al. discloses an approach to create a subset of an operating system from a computer in a removable high capacity media disk drive for disaster recovery of the computer. The removable high capacity media includes all necessary operating system components to completely load the operating system and the graphical user interface and to provide a user with access to all computer peripherals. Since the removable high capacity disk includes all of the machine-specific files for a computer system, this rescue disk is only suitable for operating the original computer system or computers with similar hardware configurations.

U.S. Pat. No. 6,601,139 issued to Suzuki discloses an information processing apparatus based on the single medium activated platform architecture operated by a removable data storage medium containing all necessary software and content. A second removable data storage medium with different software and content can also operate the same apparatus. However, the removable data storage media are designed to operate the information processing apparatus with a specific architecture instead of computers with different hardware configurations.

U.S. Pat. No. 6,718,463 issued to Malik discloses an apparatus and method for booting a data processing system from a removable medium. A first boot will identify the file system of a first data processing system and the file system of the removable medium. The necessary drivers, registry information, and applications needed to operate the hardware of the first data processing system will then be copied into the removable medium. The removable medium with the copied hardware information will be ready to boot a second data processing system, which has a similar hardware configuration to the first data processing system. U.S. Pub. No. 2004/0019778 to Gere also discloses a method and system for implementing a transportable operating system boot environment on a computer system by impressing a hardware and software configuration information onto a stored operating system environment. Both approaches create complete hardware controllable environments for specific computers on a portable apparatus, which may restrict the portability of the apparatus to only a few host computers since the required drivers and their parameter settings may cause confusion when the number of host computers increases. Although Malik discloses a way to clear up the copied information, the overhead of copying information in order to establish a bootable environment will tremendously increase the processing time for booting up a host computer.

Although there are various methods for booting a computer system using a removable medium disk drive, the conventional methods such as the ones described above generally do not provide a simple and/or convenient way to adapt a portable apparatus to a plurality of host computers in a network environment. As such there is a need in the art for an efficient way to establish an operating environment in host computers using a portable apparatus. In one example, the host computers may be public host computers in schools, libraries, Internet cafés, business lounges at airports, and other places.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

An apparatus for operating a host computer in a computer network from a portable data storage medium containing a portable operating system is disclosed. In one embodiment of the invention, the apparatus comprises a first set of instructions in the portable operating system in the portable data storage medium operatively connected to the host computer, wherein the first set of instructions can generate an operating environment for the host computer by utilizing a hardware profile stored inside the host computer or accessible by the host computer in the computer network and wherein the hardware profile is neither transferred nor impressed onto the portable operating system in the portable data storage medium; and the hardware profile containing hardware device and characteristic information, wherein the first set of instructions in the portable operating system on the portable data storage medium can access a designated location in the computer network or in the host computer to access the hardware profile and wherein the hardware profile is neither transferred nor impressed onto the portable operating system in the portable data storage medium.

Furthermore, a novel data processing system is also disclosed. The novel data processing system comprises a computer network containing a plurality of host computers, wherein each host computer has a microprocessor and a memory block; one or more portable apparatuses operatively connected to the computer network, wherein each portable apparatus comprises a removable data storage medium, a communication means to establish an operative connection to the computer network, and a portable operating system installed on the removable data storage medium for loading into at least one of the plurality of host computers; a means for selecting and identifying a particular removable storage medium from the one or more portable apparatuses as a boot disk for a particular host computer among the plurality of host computers in the computer network; an input/output means for loading the portable operating system or for selecting and loading the portable operating system from the particular removable storage medium to the particular host computer; a hardware profile stored inside the particular host computer and/or operatively connected to the computer network, wherein the hardware profile contains hardware device and characteristics information of the particular host computer; and a means for allowing the portable operating system to access a designated location of the hardware profile in the computer network or in the particular host computer, wherein the hardware profile is neither transferred nor impressed onto the one or more portable apparatuses, and wherein accessing the designated location of the hardware profile by the portable operating system is part of generating an operating environment.

In addition, a computer-readable portable storage medium containing a portable operating system for booting a host computer in a computer network by the portable operating system is also disclosed. The computer-readable portable storage medium comprises a first set of instructions in the computer-readable portable storage medium configured to make the host computer in the computer network select and identify the computer-readable portable storage medium as a boot disk for the host computer; a second set of instructions in the computer-readable portable storage medium configured to load the portable operating system into the host computer in the computer network to generate an operating environment while accessing an hardware profile of the host computer loaded in the host computer by the host computer, wherein the hardware profile contains hardware device and characteristic information of the host computer, and wherein the hardware profile resides in a separate data storage medium operatively connected to the host computer, and wherein the hardware profile is neither transferred nor impressed onto the computer-readable portable storage medium; and a third set of instructions in the computer-readable portable storage medium configured to access and utilize the hardware profile in the separate data storage medium operatively connected to the host computer to manage the operating environment provided by the portable operating system, wherein the hardware profile is neither transferred nor impressed onto the computer-readable portable storage medium from the host computer.

BRIEF DESCRIPTION OF DRAWINGS

FIG. 1 shows a prior art operating environment with preferred email settings.

DETAILED DESCRIPTION

Figure 2:
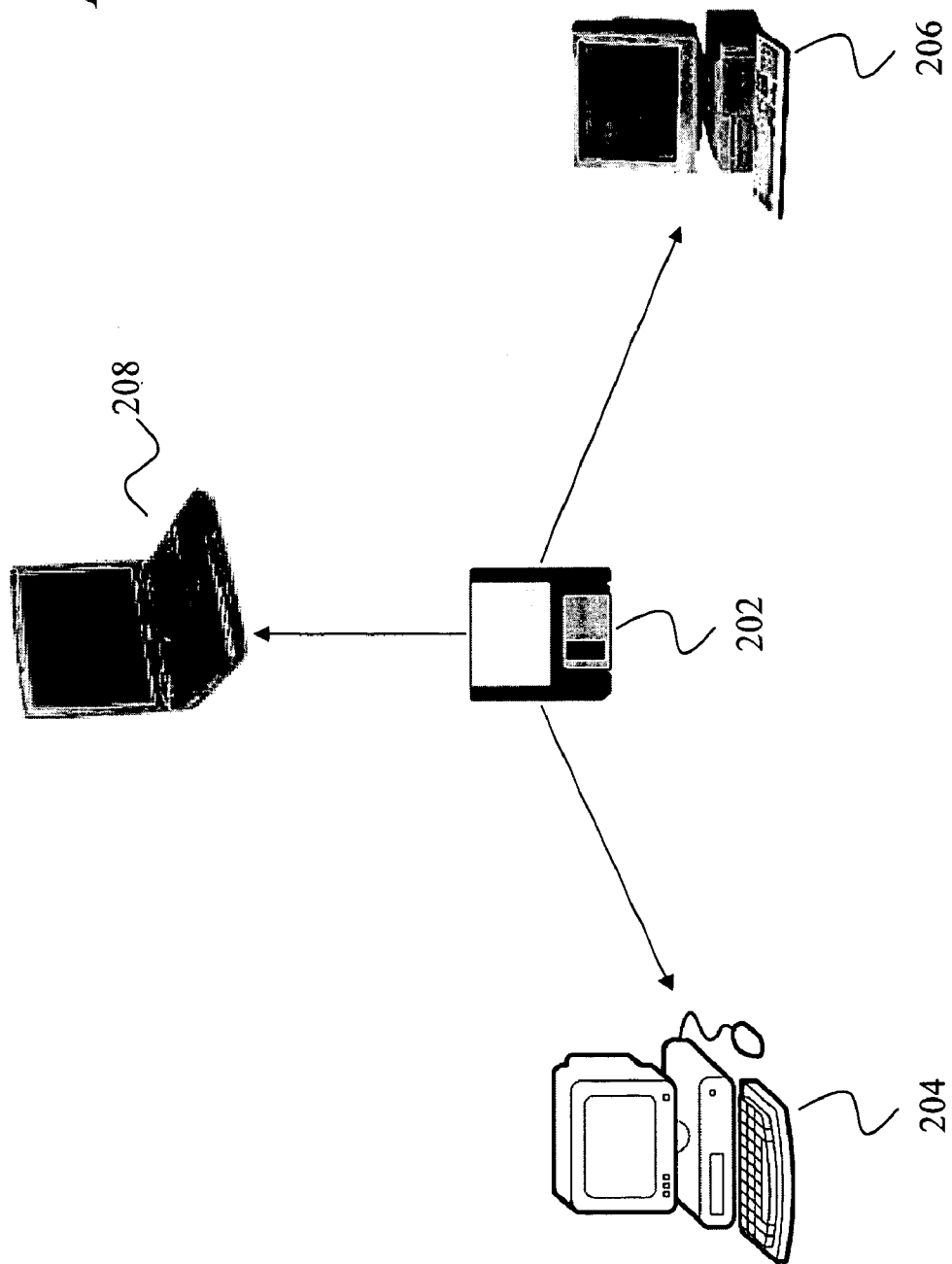
FIG. 2 shows a prior art system using a floppy disk to store files which may be shared by different computers.

Specific embodiments of the invention will now be described in detail with reference to the accompanying figures. Like elements in the various figures are denoted by like reference numerals for consistency.

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention. The detailed description is presented largely in terms of procedures, logic blocks, processing, and other symbolic representations that directly or indirectly resemble the operations of data processing devices coupled to systems. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Referring now to the drawings, in which like numerals refer to like parts throughout the several views, FIG. 1 shows an example of an operating environment. In particular, the environment includes an interface such as a Microsoft Windows XP operating system interface including a task bar 102. A plurality of shortcuts to software applications are displayed on a left-hand side of the interface, where Adobe Acrobat 104 is for reading Adobe's portable-document-format files, Windows Internet Explorer 106 is for browsing the internet, Microsoft Access 108 is for editing spreadsheet documents, Microsoft PowerPoint 110 is for designing presentation slides, Microsoft Word 112 is for authoring word documents, Windows Media Player 114 is for playing multimedia files, and Recycle Bin 116 is for temporarily storing discarded files. An email account pop-up dialog 118 shows email settings, where incoming emails are served from a POP3 server 120 with account information 122 and outgoing emails being served from a SMTP server 124.

The present invention provides a portable apparatus, which can operate different host computers while preserving a consistent operating environment. An operating environment generated by a portable apparatus in accordance with the invention preferably contains a list of user-installed software applications and user preferred parameter settings for those applications. Having a consistent operating environment will not only allow the users to work on their familiar applications but also avoid tedious setting of parameter settings when working on a different host computer. More importantly, a familiar operating environment may also include a set of personal files generated from the software applications. The set of personal files are usually valuable and irreplaceable to a computer user.

Traditionally, a user may use a floppy disk 202 to share the set of personal files among multiple computer systems, e.g., a work computer 204, a home computer 206, and a laptop computer 208 as shown in FIG. 2. In order to provide a similar operating environment to a user, all the computer systems 204, 206, and 208 may have installed a same set of basic software applications. A major drawback for this approach is that certain information may be tied to a specific application and cannot be easily shared. One example is the inbox containing the past incoming emails in an email application. One needs to go through tedious exporting and importing procedures in order to share this information among the computer systems 204, 206, and 208.

Figure 3:
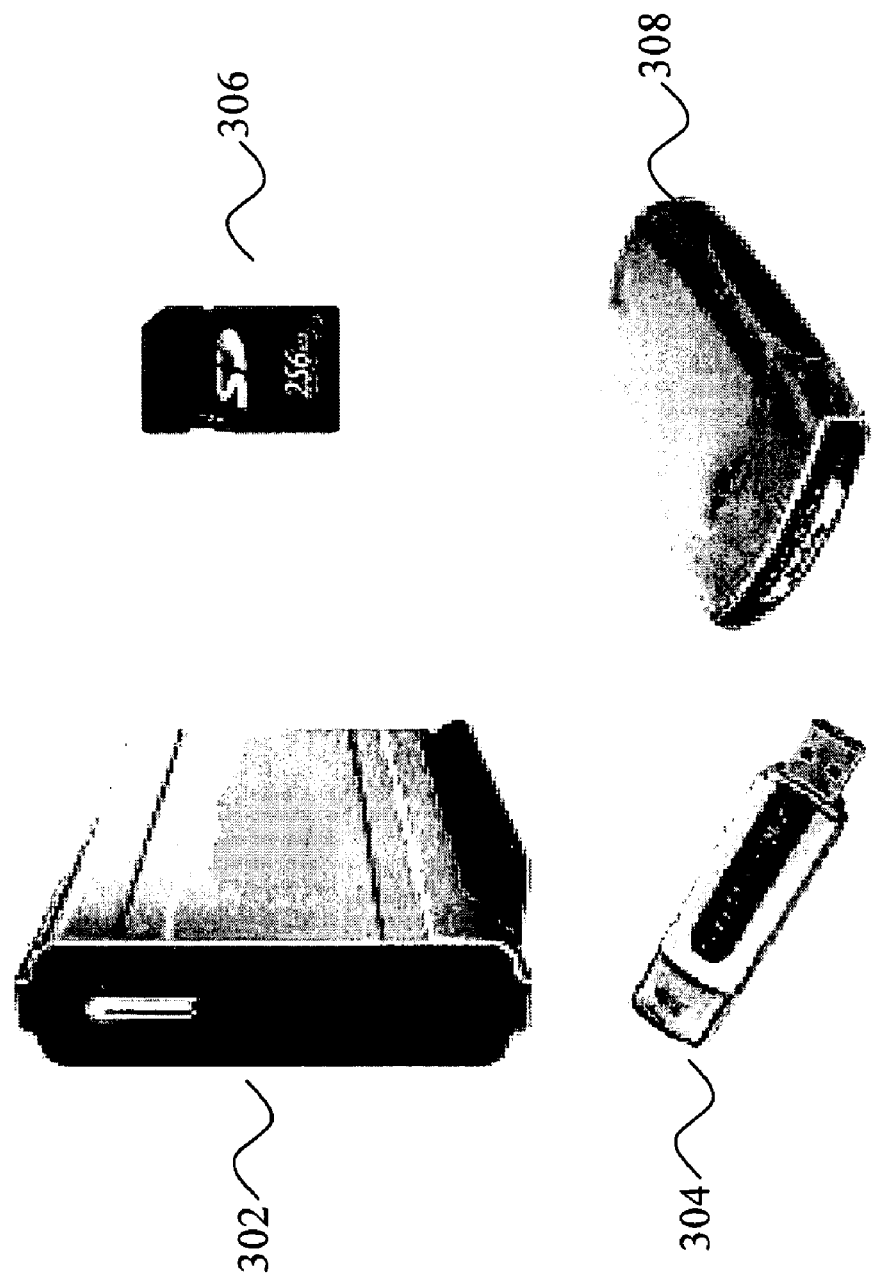
FIG. 3 shows several examples of prior art removable data storage media which may be used as portable apparatus.

Recently, the capacity of external storage devices has increased tremendously, which allows for the storage of more information compared to the storage capacity of floppy disk 202. Several examples of removable data storage media are shown in FIG. 3, in particular a 3.5" USB/Firewire combo external hard drive 302, a USB flash drive 304, a secure digital flash memory card 306, and a 2.5" external USB/Firewire combo external hard drive 308. These removable data storage media can store information from hundreds of megabytes to hundreds of gigabytes. In addition to being used as extra storage media, these removable data storage devices have also been used as backup systems for systems stored on the internal hard drives of computers.

One requirement for a backup system is the ability to boot from a medium containing a copy of the internal system. Many developments have been achieved in this field of booting from the external storage devices through connections such as Universal Serial Bus (USB) and Firewire. One example is that new Intel Desktop Boards support the ability to boot to USB devices. This feature, known as boot-to-USB, is a BIOS (Basic Input/Output System) capability that allows a PC to boot from a USB device. Although this approach provides a way to operate a computer from a system stored in a removable device, it may be considered as a portable apparatus with a limited portability since this backup system can only operate computers with a specific hardware configuration.

Figure 4:
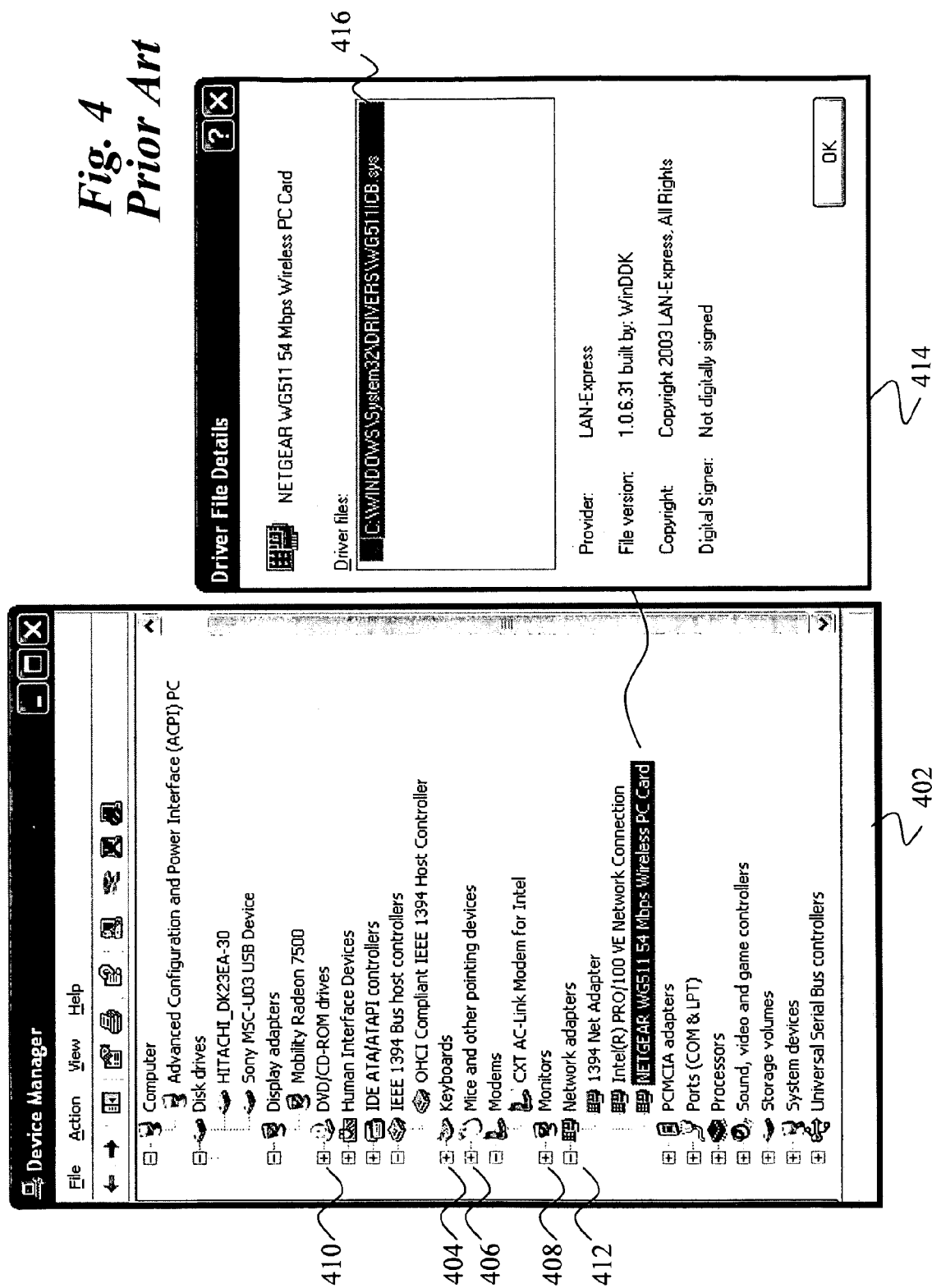
FIG. 4 shows a prior art hardware manager with preferred network adapter settings.

The major challenge for a portable apparatus is to deal with different hardware configurations of host computers. FIG. 4 shows an example of a device manager 402 for a host computer, which contains information for a list of hardware devices, such as keyboards 404, mice 406, monitors 408, DVD/CD-ROM devices 410, and network adapters 412. Devices 404, 406, 408, 410, and 412 may be manufactured by different manufacturers and as such require installing drivers provided by the manufacturer. An example of a network adapter 412 having a wireless PC card 414 uses a specific driver 416 loaded in the system. The manufacturer may also provide a utility program to configure the driver. For example, the driver 416 for the wireless PC card may need to specify the access point, encryption length, encryption phrase, and other parameters. Similar examples may also apply to other peripheral devices, such as network or local printer settings and local area network TCP/IP settings.

Figure 5:
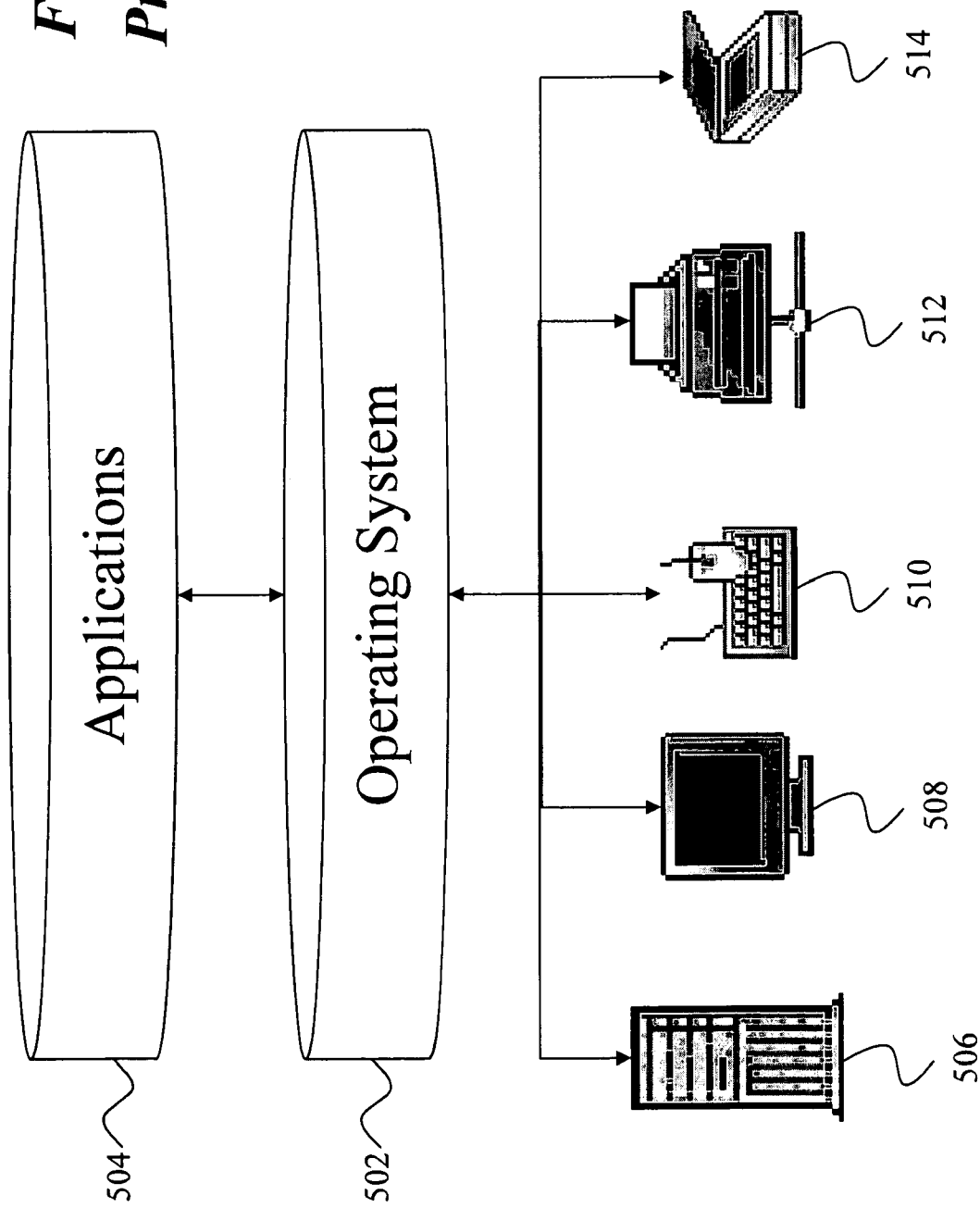
FIG. 5 shows a prior art operating system which provides an interface between hardware and software applications.

An operating system provides an interface between the hardware of the computer and the application software that users run on the computer. It also performs basic tasks, such as recognizing input from keyboards 404, sending output to monitors 408, keeping track of files and directories on a disk, and controlling peripheral devices such as disk drives and printers. FIG. 5 shows an example of an operating system 502 which may be operable to control hardware such as desktop computer 506, monitor 508, mouse/keyboard 510, printer 512, and scanner 514, and software applications 504. The required drivers for the operating system 502 to communicate with the hardware may be installed in a specific location such as C:\Windows\System32\Drivers. Alternatively the information required to locate the installed drivers for operating system 502 may be stored in a database such as Microsoft Windows Registry. Because of the interrelationship between the installed drivers and other installed hardware-specific software, the installed drivers and other installed hardware-specific software can be considered as part of physical system resources controlled by a hardware layer of the operating system 502 for a standalone system with one system operating one computer.

Figure 6:
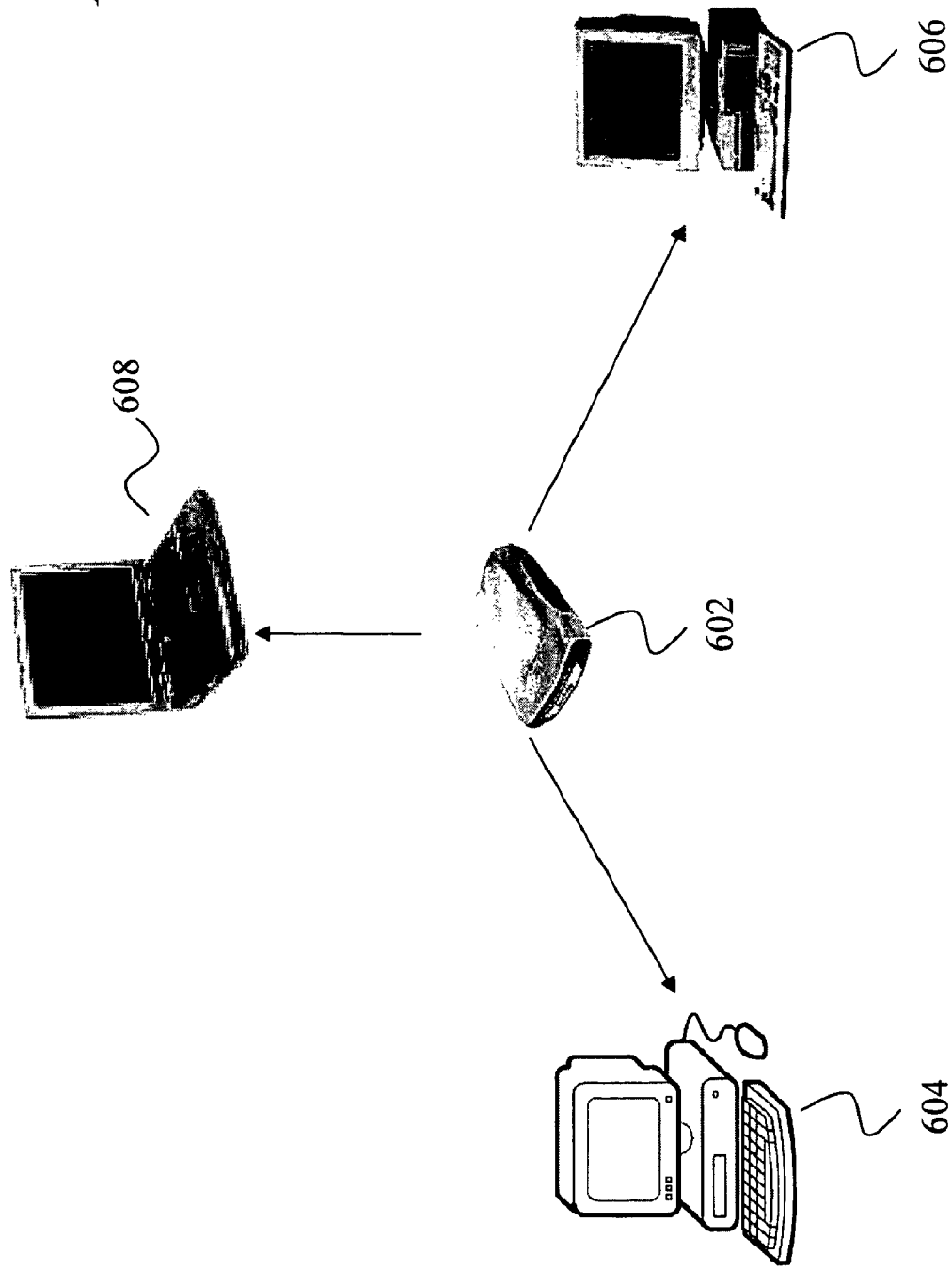
FIG. 6 shows a prior art portable apparatus operating different host computers.

FIG. 6 shows an example of a portable apparatus 602 supporting three host computers, 604, 606, and 608. In order to allow host computers 604, 606, and 608 to be being fully operational using the portable apparatus 602, one possible prior art approach includes having the drivers and other hardware-specific software for host computers 604, 606, and 608 installed in the portable apparatus 602. In this case, the hardware layer of the operating system in the portable apparatus 602 is able to find the proper physical system resources while communicating with a specific hardware in any of the host computers 604, 606, and 608. However, this prior art approach may be cumbersome especially when more than one of host computers 604, 606, and 608 uses the same driver with different parameter settings. For example host computers 604, 606, and 608 may all use the same wireless PC card as a network adapter but different encryption methods may be specified in their access points.

Figure 7:
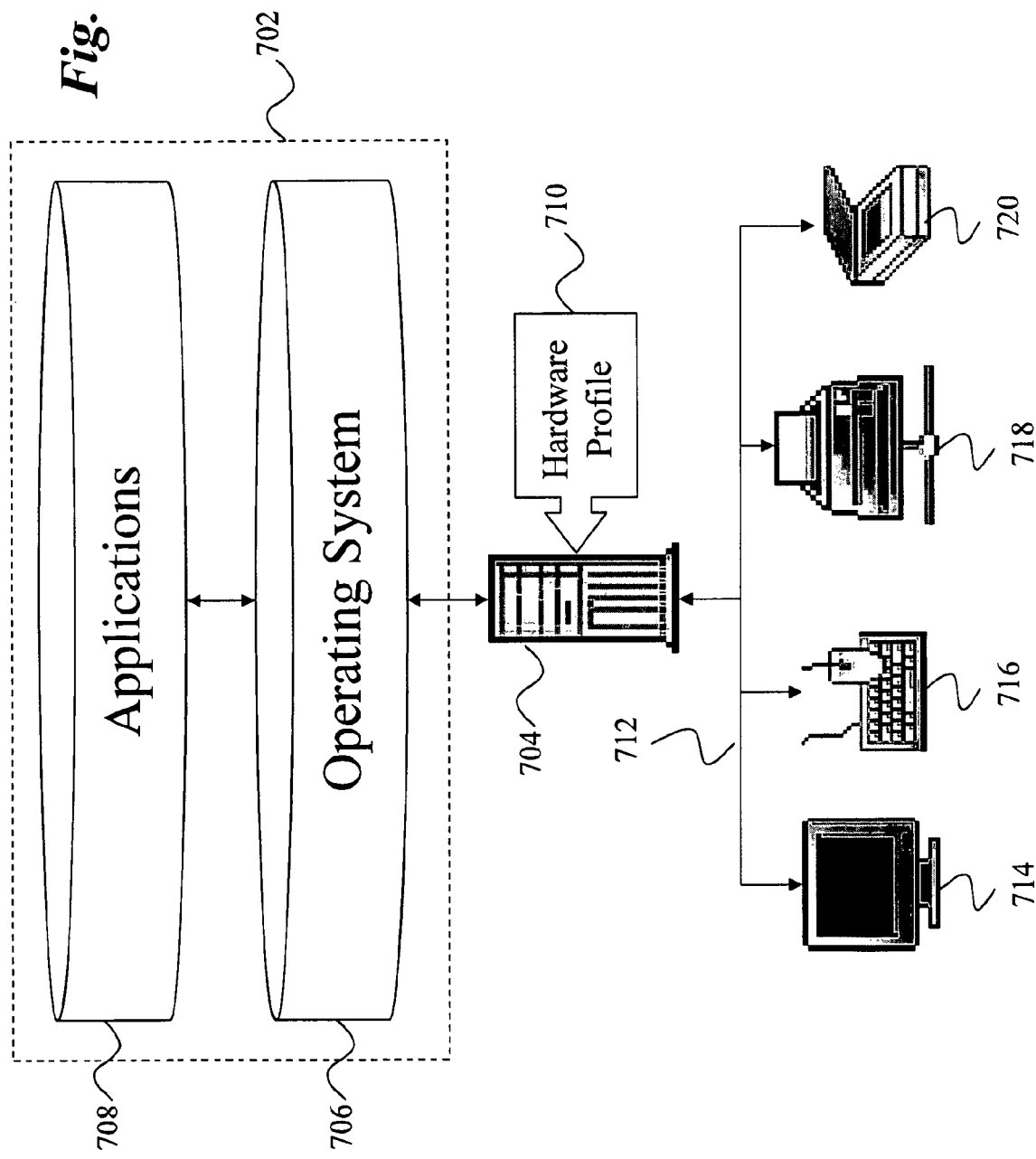
FIG. 7 shows a portable apparatus incorporating a hardware profile stored in a host computer in accordance with an embodiment of the invention.

FIG. 7 shows an embodiment of a portable apparatus 702 and a host computer 704 in accordance with the present invention. The portable apparatus 702 may contain at least one operating system 706 and a list of installed applications 708 that provide a consistent operating environment for a user among a plurality of host computers. The drivers and other hardware-specific software necessary for the portable apparatus 702 to operate the host computer 704 may be stored in a storage medium drive associated with the host computer 704. In particular, a hardware profile 710, which may include hardware information such as parameter settings and device drivers suitable for the at least one operating system in the portable apparatus 702, may be generated and stored in a non-removable storage medium drive of the host computer 704 to allow the at least one operating system in the portable apparatus 702 to identify the proper physical system resources while communicating with the host computer 704 and peripheral devices 712 such as monitor 714, mouse/keyboard 716, printer 718, and scanner 720. In another embodiment, the hardware profile 710 may be stored in another removable data storage medium operatively connected to the host computer 704, or in a data storage medium operatively connected to the host computer 704 through a computer network.

Furthermore, the hardware layer of the at least one operating system 706 in the portable apparatus 702 needs to incorporate the physical system resources covered in the hardware profile 710 associated with the host computer 704. Before a computer can run an operating system, it must load the operating system from a storage medium to the computer's working memory, which is ordinarily random access semiconductor memory (RAM). This is carried out through a process known as "booting" the computer. Booting occurs automatically when the computer is first turned on in a process called a "cold boot" and booting can be triggered while the computer is running in a process called a "warm boot". One embodiment of incorporating the hardware profile 710 into the at least one operating system 706 is performed during the booting sequence of the host computer 704.

Figure 8:
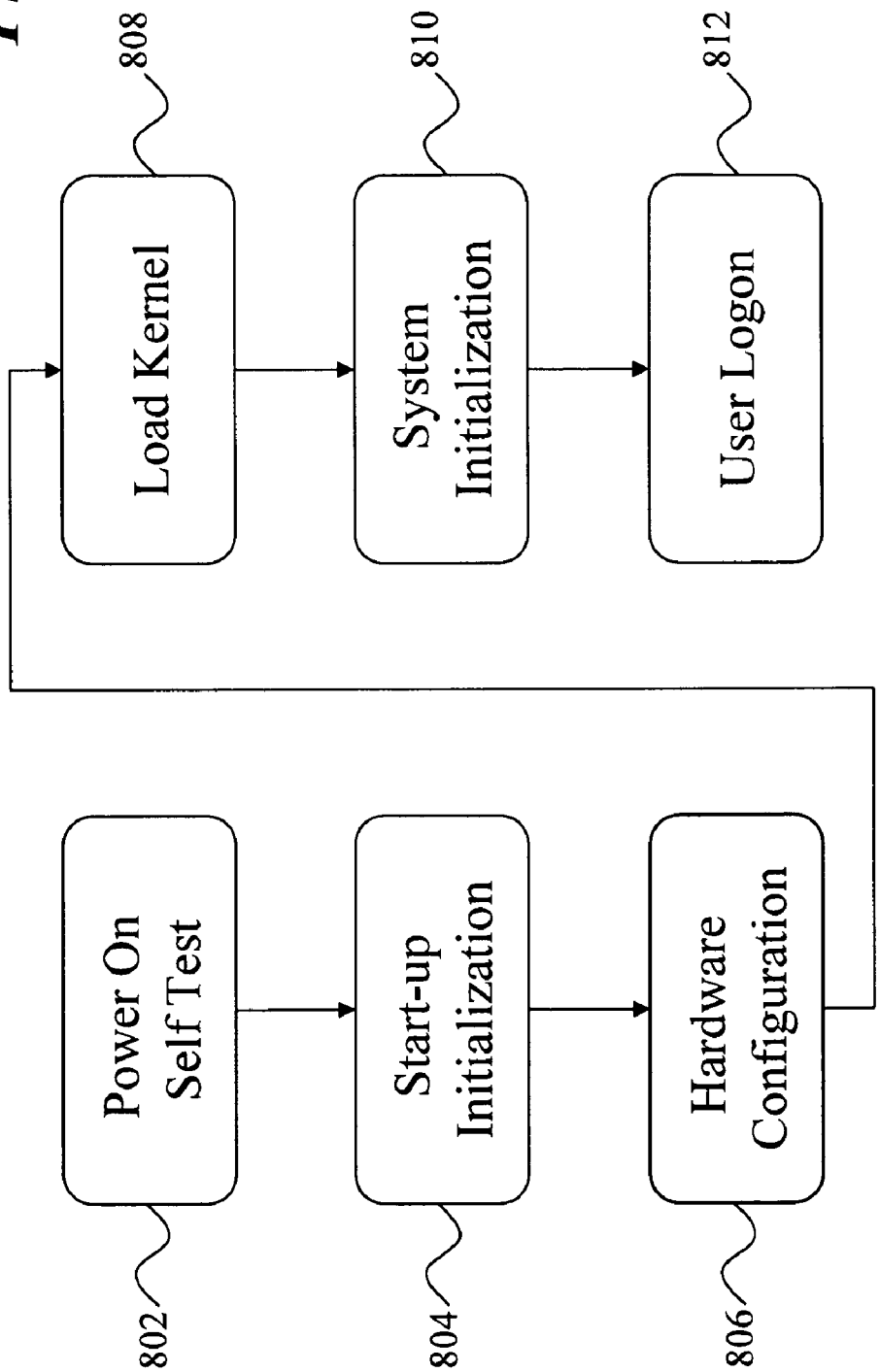
FIG. 8 shows a prior art sequence of procedures for booting a computer system.

FIG. 8 shows an example of a prior art method for a booting sequence. A first step 802 is called the power-on-self-test (POST). POST step 802 may check whether key hardware elements, such as memory, keyboard, video card, etc., are preset, and initialize those elements into an operational state. A second step 804 is called the start-up initialization. During this step 804, a first sector of the storage medium is examined to locate a Master Boot Record and a Partition Table of the operating system that the computer will load. The first two steps 802 and 804 may be controlled by firmware stored in one or more basic input/output system (BIOS) chips inside the computer. Although the following discussion is focused on the BIOS for IBM-compatible computers, similar discussions can also be applied to the Extensible Firmware Interface shell for Itanium-based computers, the SRM Console for Alpha-system computers, and similar devices/programs in other types of computers. The parameter settings in the BIOS specify the order of checking the storage medium drives in the start-up initialization. A possible order will be drive "A" to determine if it contains a formatted floppy disk followed by hard drive "C" if the floppy drive is empty. After a valid boot record is found, the BIOS program loads the first sector of the disk into RAM and passes the control to the boot record. The boot record may instruct the computer loading other operating system files into RAM to carry out the rest of the booting sequence.

At a hardware configuration step 806, information about the system and attached devices may be gathered. In particular, a root directory of the boot disk is searched for a configuration file, e.g., CONFIG.SYS for Windows, which contains commands instructing the operating system on how to handle the device drivers for hardware devices not recognized by the BIOS that may be connected to the computer. A kernel, the core of the operating system, is then loaded into RAM in a step 808. The system may be further initialized by executing a batch file, such as AUTOEXEC.BAT in Windows, containing a series of commands or program names to be executed by the computer each time the computer is turned on in a step 810. Finally, the system is ready to be used and may wait for a first user to log on in a step 812.

Figure 9:
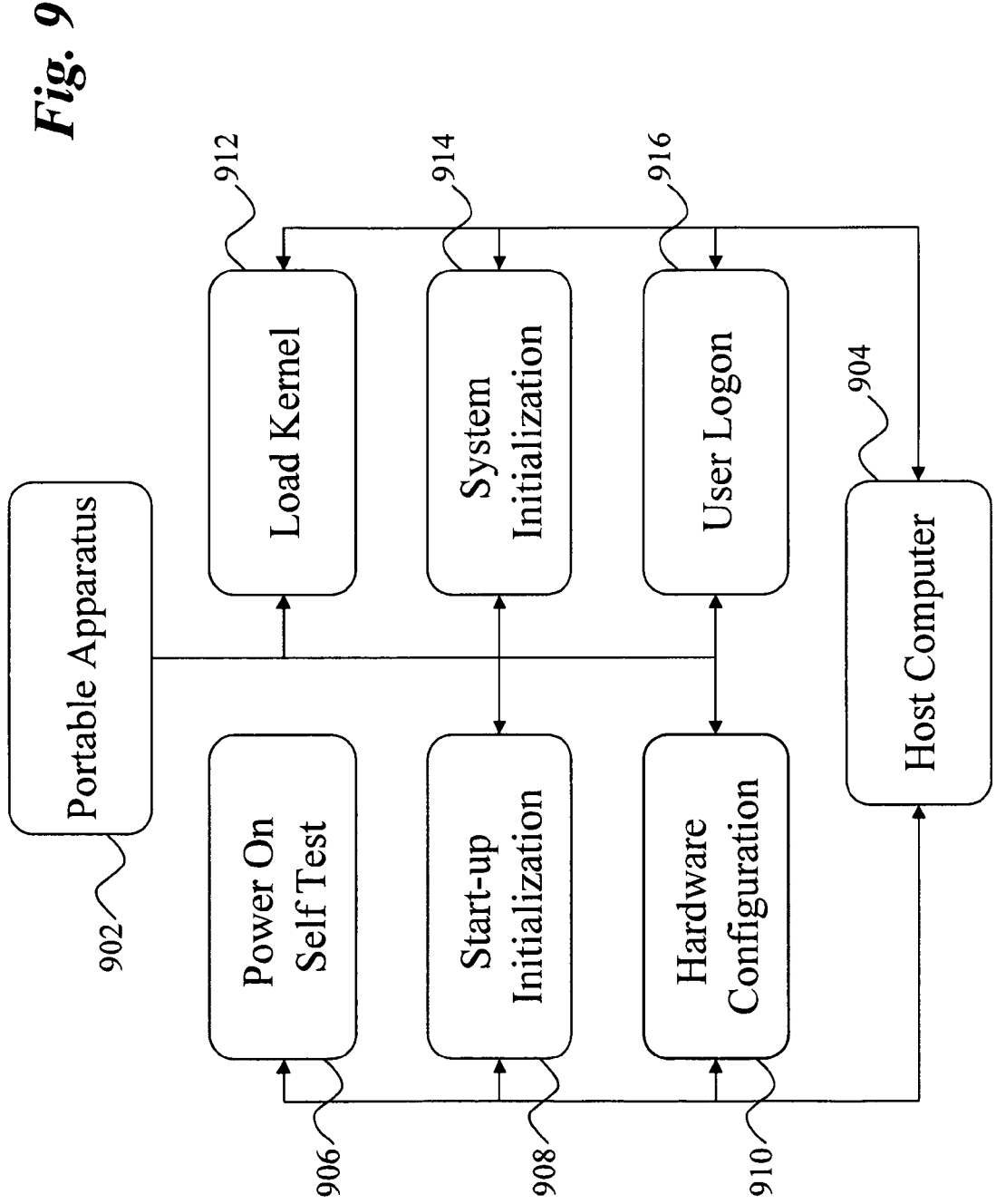
FIG. 9 shows an example of booting a host computer with a portable operating system in accordance with an embodiment of the invention.

FIG. 9 shows an example of a booting procedure of a data processing system comprising a portable apparatus 902, which contains at least one portable operating system installed in a removable data storage medium, and a host computer 904 in accordance with the present invention. In particular, after a POST step 906 the BIOS in the host computer 904 will specify the storage medium of the portable apparatus 902 as the boot drive in a start-up initialization step 908. In one embodiment, the portable apparatus 902 may be set as the first drive to be checked in the BIOS of the host computer 904, using features like the aforementioned "boot-to-USB". In another embodiment, the BIOS may first load a boot record from a storage drive attached to the host computer 904. Then, a loaded boot record will specify the portable apparatus 902 as the substitute master boot record for the rest of booting sequence. In another embodiment the loaded boot record will wait and detect periodically to check whether the portable apparatus 902 has been plugged into the host computer 904. Once the portable apparatus 902 is identified, the loaded boot record will specify the portable apparatus 902 as the substitute master boot record for the rest of the booting sequence. In a hardware configuration step 910, information in a configuration file of the portable apparatus 902 and the hardware information in the host computer 904 will both be gathered by the at least one operating system. During loading of a kernel 912, a designated location in the host computer 904 may also be searched for further incorporating hardware information. In one embodiment, the hardware information may be mounted into a loaded kernel and links or shortcuts may be created in the loaded kernel to incorporate the hardware information of the host computer 904. After the system is initialized in a step 914, a list of user-familiar applications from the portable apparatus will be ready for users in a step 916.

In the following, detailed discussions of FIG. 9 for different types of operating systems are given. First discussed is an example of the boot sequence for Windows 95/98/ME operating systems. The loaded boot record in the start-up initialization step 908 will further load two system files, i.e., IO.SYS and MSDOS.SYS. The IO.SYS loads CONFIG.SYS and executes AUTOEXEC.BAT in the hardware configuration step 910. In one embodiment, the CONFIG.SYS will point to designated locations in the disk storage associated with the host computer 904 for loading hardware drivers. In another embodiment, a script or program is included in the AUTOEXEC.BAT, which will scan through the disk storage associated with the host computer to create links or shortcuts in the installed portable operating system. The loaded kernel of step 912 may incorporate the hardware devices in the host computers through those created links. In an additional embodiment, a modified kernel is introduced, which will directly incorporate the hardware devices in the host computer by scanning through the disk storage associated with the host computer or by loading specific files in the disk storage associated with the host computer. The hardware information incorporated into the loaded operating system from the portable apparatus 902 is called the "Hardware Profile" of the host computer 904.

In another example of the boot sequence for Windows NT operating systems, the loaded boot record will load NTLDR into memory in the start-up initialization step 908. In the hardware detection/configuration step 910, the loaded NTLDR will further load NTDETECT.COM for hardware detection, where the detected information will be put under the dynamic registry key HKEY_LOCAL_MACHINE\HARDWARE\DESCRIPTION, and the loaded NTLDR will also proceed to read in the HKEY_LOCAL_MACHINE\SYSTEM Registry hive (a hive is a file that contains a Registry subtree) which contains the device driver information. NTLDR further loads the kernel file, NTOSKRNL.EXE into memory. At the same time, NTLDR also loads the hardware abstraction library, HAL.DLL, into memory, which will insulate the kernel from hardware. After that, NTLDR locates the kernel function in NTOSKRNL.EXE's in-memory image and transfers control to NTOSKRNL.EXE in step 912. In one embodiment, a script or program is called by NTLDR, which will modify the Registry hive for the device drivers based on the hardware profile in the host computer 904. In another embodiment, a modified NTLDR will load an extra Registry hive containing the hardware profile from the host computer 904. In an additional embodiment, a customized HAL.DLL is loaded to incorporate the hardware profile of the host computer 904.

In an additional example of the boot sequence for LINUX operating systems, the loaded boot record will load a boot loader, such as LILO/GRUB for IBM-compatible computers, ABOOT for the Alpha-system computers, and ELILO for the Itanuim-based computers, into memory in the start-up initialization step 908. The boot loader will first load the kernel into the memory in step 912. Then the loaded kernel will initialize the device drivers for the hardware configuration in step 910. In one embodiment, a modified kernel is introduced, which will directly incorporate the hardware profile in the host computer 904.

Summarizing the examples illustrated in FIG. 9, a portable operating system may include at least one operating system stored in a first data storage medium or portable apparatus 902, which is loosely coupled with a hardware profile 710 stored in a second data storage medium or host computer 904. During the boot sequence, the loaded at least one operating system is able to incorporate the hardware profile 710 that allows the loaded system to operate the hardware devices associated with the host computer 904. The portable apparatus 902 may include a removable data storage medium with the at least one installed portable operating system. The host computer 904 may include a data processing apparatus with a stored hardware profile 710, which is able to boot from the portable apparatus 902. In one embodiment, the portable apparatus 902 may include a plurality of installed portable operating systems for different types of hardware profiles and/or different types of host computers.

Figure 10:
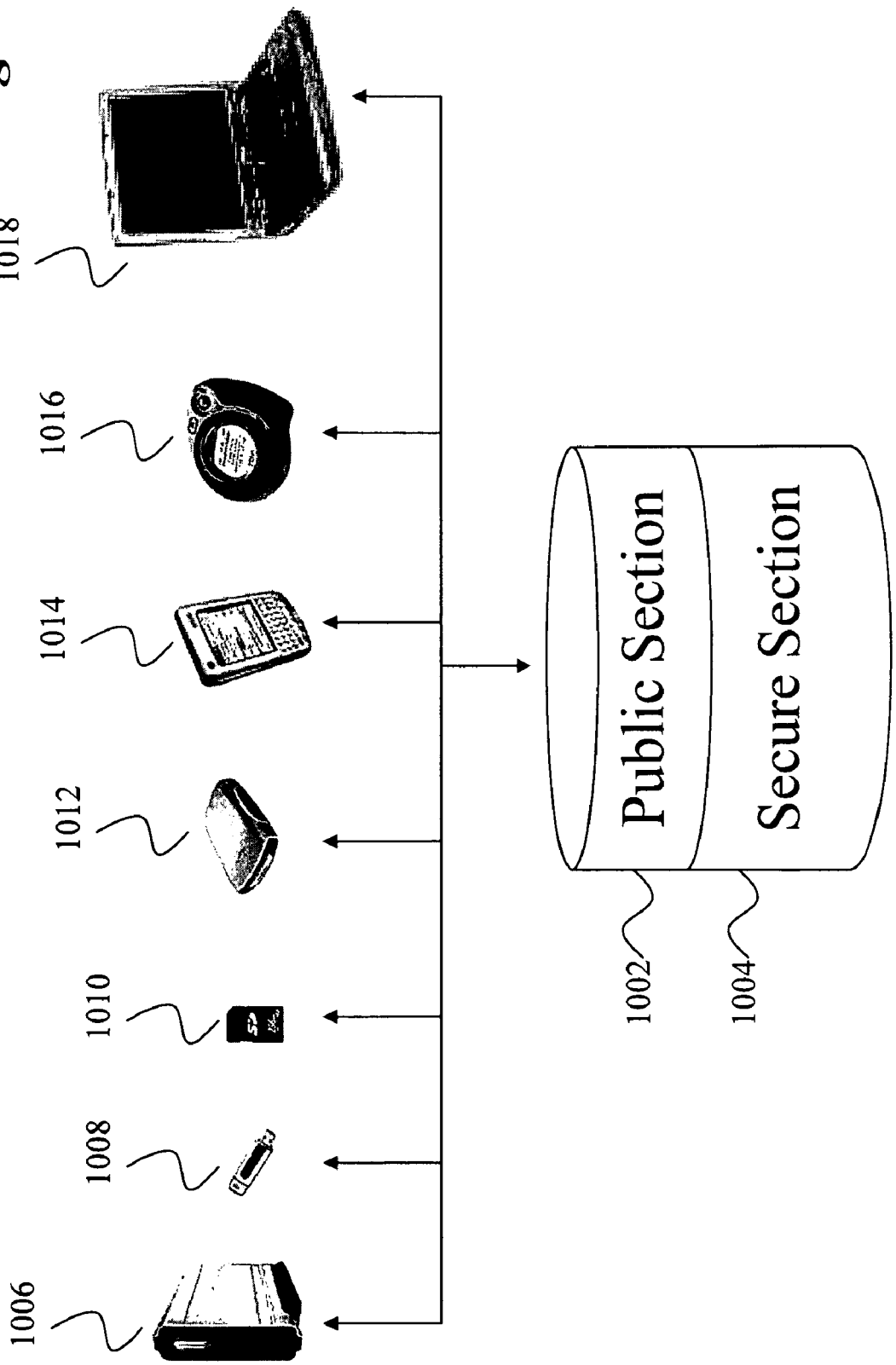
FIG. 10 shows an example of separating the removable data storage medium of a portable apparatus into public and secure sections in accordance with an embodiment of the invention.

Since the portable apparatus 902 is implemented in a removable data storage medium, access authentication is considered an important feature to protect data if the system is lost. FIG. 10 shows an example of a system separated into a public section 1002 and a secure section 1004 in accordance with the invention. The public section 1002 may be used to store the at least one operating system and applications. The secure section 1004 may be used to store confidential information. The access authentication, such as password protection, fingerprint verification, or voice activation, can be implemented during a user log-on. If the portable apparatus 902 is not the boot drive in a computer system, the secure section 1004 may require authentication during accessing or may be totally excluded from the file system. FIG. 10 also shows a list of possible portable apparatus. Among them, a 3.5" USB/Firewire combo external hard drive 1006, a USB flash drive 1008, a secure digital flash memory card 1010, and a 2.5" external USB/Firewire combo external hard drive 1012 are devices for data storage only. The enclosed hard drives in a PDA 1014 and a MP3 Player 1016 can be configured as portable apparatus 902 to operate host computers 904. Furthermore, the internal hard drive of a laptop 1018 can also be configured as a portable apparatus 902 to operate host computers 904 especially under an environment with restricted hardware access rights. One example is a visitor having laptop 1018 who needs Internet access. To avoid accessing a company's Intranet, the portable apparatus 902 installed in the internal hard drive of the laptop 1018 will operate the host computer 904 provided by the company with a specific IP address defined in the hardware profile, which only allows the Internet access.

Figure 11:
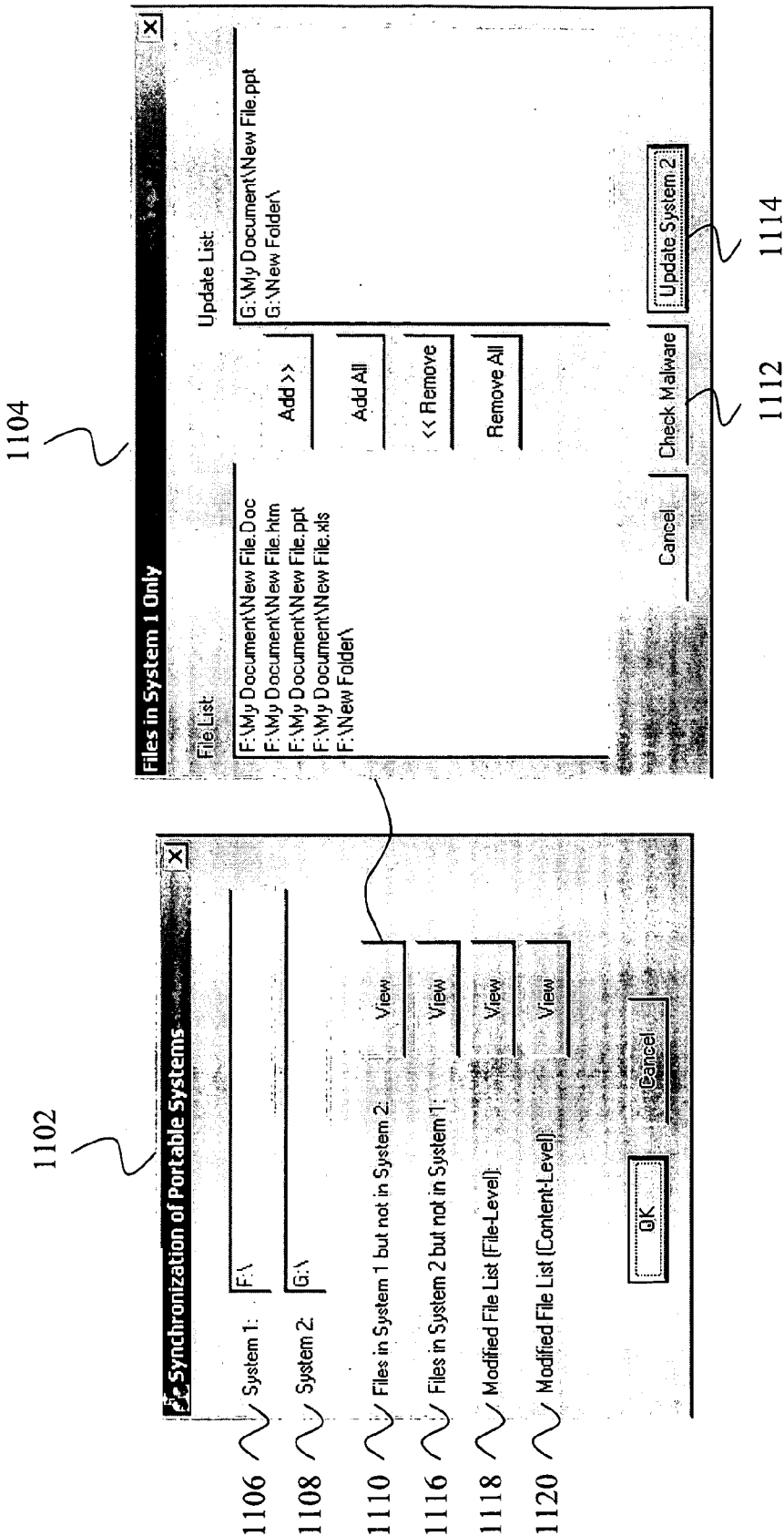
FIG. 11 shows a method for synchronizing two portable apparatus in accordance with an embodiment of the invention.

Another important feature for a portable apparatus 902 is the ability to duplicate a back-up system or to synchronize two systems since the portable apparatus 902 implemented in a removable data storage medium may easily get damaged physically. FIG. 11 illustrates a method to synchronize two systems, where the two systems could be two portable apparatus 902. A user first specifies two systems 1106 and 1108 in the synchronization procedure 1102. A feature 1110 in the procedure 1102 will list all the files in system 1106 but not in system 1108 in a dialog 1104. The user then selects an updated list of files to add into system 1108 from system 1106. Before updating system 1108 in a step 1114, a malware checking procedure 1112 for finding malicious software may be applied to the selected files in the update list. To duplicate a back-up system, the user can put in an empty portable apparatus in system 1108 and add all the files in system 1106 into system 1108. A similar procedure 1116 can be also applied to files in system 1108 but not in system 1106. A procedure for synchronizing modified files in the file level 1118 will list files with the same path and name in both systems with different file size and/or modified time. The user can update one system by importing files with later modified time from the other system. A procedure for synchronizing modified files in the content level 1120 will list files with the same path and name in both systems with different file content. The user can again update one system by selecting files in the list from the other system.

A data processing apparatus for synchronizing files may comprise a host computer 904 and at least two portable apparatus 902. A procedure may be introduced to select one of portable apparatus 902 as the designated portable apparatus 902 to boot the host computer 904. A second portable apparatus 902 is then selected to update files to or from the designated portable apparatus 902. As described previously, the access authentication and the malware search may be required before performing the file manipulation.

In another embodiment of the present invention a borrowed host computer may be operated by a portable apparatus 902. To protect the content in the internal system of the borrowed host computer, the at least one operating system in the portable apparatus 902 may be configured in a way that it is non-intrusive to the borrowed host computer. One example of a configuration may restrict the loaded at least one operating system only to read the hardware profile 710 and to access the devices listed in the profile.

Although aforementioned embodiments focus on discussing one portable apparatus 902 to operate multiple host computers 904, one main benefit of the current invention is the cost reduction when a large number of portable apparatus 902 share a smaller number of host computers 904. One example is a school computer lab with a certain number of computers being shared by students. Since the cost of the portable apparatus 902 may be only a fraction of the cost of the host computer 904, to provide students with their own portable apparatus 902 will have less financial burden compared to providing each student with a host computer system 904. The students can also use their portable apparatus 902 on host computers 904 at home, which once again can be shared by other family members. A similar case can also be applied to some centralized service facility such as a call center, where many operators working on different shifts share a same set of host computers 904. The concept of portable apparatus 902 and host computers 904 introduces tremendous flexibility in terms of organizing such a facility. Other similar cases for sharing host computers 904 can also include libraries, Internet cafés, business lounges at airports, and other places.

Figure 12:
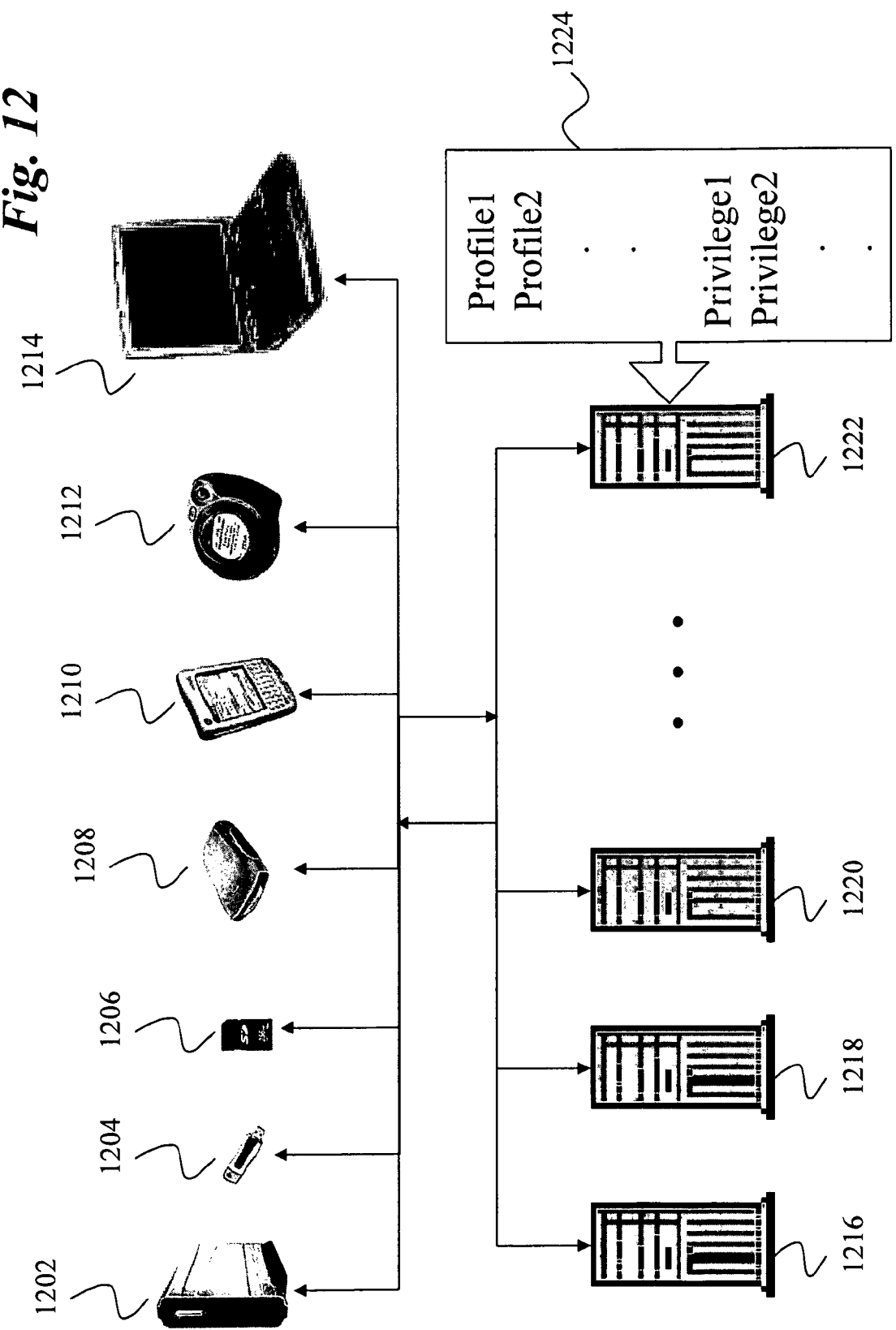
FIG. 12 shows a data processing system with multiple host computers shared by multiple portable apparatus in accordance with an embodiment of the invention.

FIG. 12 shows an example of an environment with multiple host computers 1216, 1218, 1220, and 1222, supporting multiple portable apparatus 1202, 1204, 1206, 1208, 1210, 1212, and 1214. Since different users may subsequently use one of host computers 1216, 1218, 1220, and 1222, a clean-up procedure may be needed to avoid any unintended leftover information in one of host computers. This procedure may be implemented in the user's log-out stage. Furthermore, a public host computer may need to include multiple hardware profiles 1224 in order to support different types of portable apparatus 1202, 1204, 1206, 1208, 1210, 1212, and 1214 and different releases of portable apparatus 1202, 1204, 1206, 1208, 1210, 1212, and 1214. One of host computers 1216, 1218, 1220, and 1222 may also include multiple privilege configurations 1224 to restrict the access rights for some portable apparatus 1202, 1204, 1206, 1208, 1210, 1212, and 1214, e.g., only certain users have the right to use the printers in a business lounge.

Some removable data storage media can be easily stolen when a user is temporarily absent from a public host computer. In one embodiment, all the portable apparatus 1202, 1204, 1206, 1208, 1210, 1212, and 1214 are connectable to a computer network through a device like a USB hub and are centralized under a supervised environment. When a user checks in one of portable apparatus 1202, 1204, 1206, 1208, 1210, 1212, and 1214 under such an environment, a host computer will be assigned for the one of portable apparatus 1202, 1204, 1206, 1208, 1210, 1212, and 1214. The assigned host computer is operatively connected to the one of portable apparatus 1202, 1204, 1206, 1208, 1210, 1212, and 1214 through the computer network. A server computer may also be needed in this environment to manage the assignments between host computers 1216, 1218, 1220, and 1222 and portable apparatus 1202, 1204, 1206, 1208, 1210, 1212, and 1214. Furthermore, centralized hardware profiles or privilege configurations can also be stored in the server computer or other data storage media connected to the computer network.

Another embodiment to prevent portable apparatus 1202, 1204, 1206, 1208, 1210, 1212, and 1214 from being stolen is to have a built-in device such as the flash memory card reader within a host computer. The host computer may be operatively connected to one of portable apparatus 1202, 1204, 1206, 1208, 1210, 1212, and 1214 through this device. The manual eject function of the connecting device is disabled when one of the portable apparatus 1202, 1204, 1206, 1208, 1210, 1212, and 1214 operates the host computer. The user only needs to enable the screensaver with password protection when temporarily leaving the host computer. An additional embodiment is to implement a standby mode with a snapshot of the current operating stage in the RAM or the swap space of the hard drive in the host computer that allows the user to temporarily remove the one of portable apparatus 1202, 1204, 1206, 1208, 1210, 1212, and 1214 from the host computer. When the one of portable apparatus 1202, 1204, 1206, 1208, 1210, 1212, and 1214 is plugged back to a host computer in the standby mode, the host computer will verify the identity of the one of plugged portable apparatus 1202, 1204, 1206, 1208, 1210, 1212, and 1214 and/or request for password before resuming the operating stage.

Consider a data processing system comprising at least one portable apparatus 1202, 1204, 1206, 1208, 1210, 1212, and 1214 and a plurality of host computers 1216, 1218, 1220, and 1222 operatively connected through a computer network. An operative connection may be established between one of the portable apparatus 1202, 1204, 1206, 1208, 1210, 1212, and 1214 and a designated host computer. In one embodiment, the one of portable apparatus 1202, 1204, 1206, 1208, 1210, 1212, and 1214 may be physically attached to the designated host computer through connections like FireWire, USB, SCSI, RS-232, PCMCIA, PS/2, EPP, and ECP. In another embodiment, the one of portable apparatus 1202, 1204, 1206, 1208, 1210, 1212, and 1214 and the designated host computer are operatively connected through the computer network with connections like Ethernet, Gigabit Ethernet, 802.11 a, 802.11 b, 802.11 g, Bluetooth, and CDPD. When the at least one operating system in the one of portable apparatus 1202, 1204, 1206, 1208, 1210, 1212, and 1214 is loaded into the designated host computer, the loaded at least one operating system incorporates a hardware profile containing hardware information about the designated host computer. The hardware profile may be stored in the designated host computer, one of said plurality of host computers 1216, 1218, 1220, and 1222, or a network storage device on the computer network.

Figure 13:
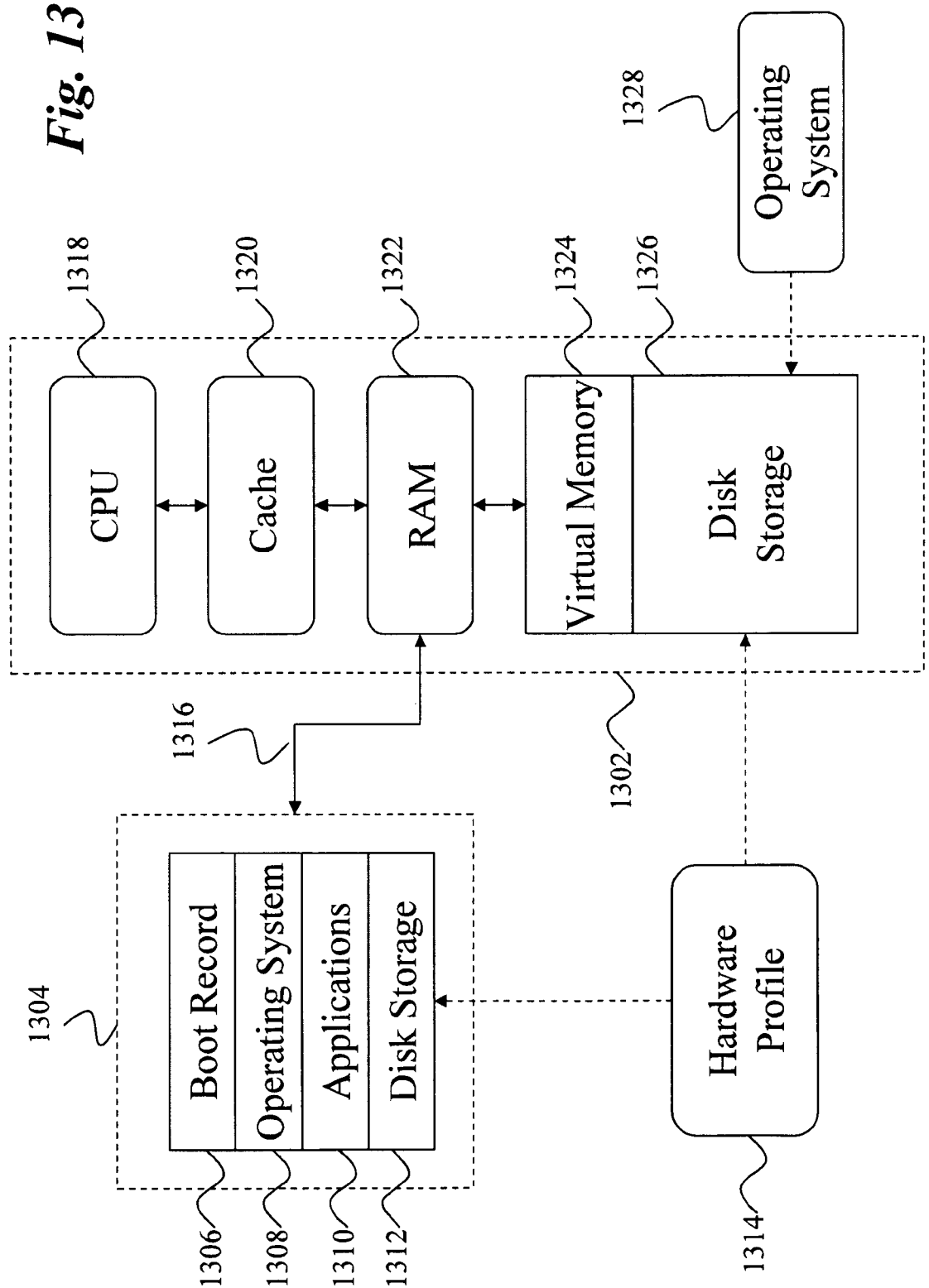
FIG. 13 shows an example of memory and storage management of a portable apparatus and a host computer in accordance with an embodiment of the invention.

To further elaborate the different approaches of operating a host computer by a portable apparatus, FIG. 13 shows an example of memory and storage management of a portable apparatus and a host computer 1302. Consider a removable medium drive 1304 containing a file system with stored information for a boot record 1306, at least one operating system 1308, applications 1310, and possibly other files in a disk storage 1312. During the boot process, the host computer 1302 will identify the removable medium drive 1304 as the boot device and load the boot record 1306 into a particular location, such as 0:007 Ch, in a RAM 1322. The loaded boot record processed by CPU 1318 through Cache 1320 will further instruct the host computer 1302 to load the at least one operating system 1308. The at least one operating system 1308 is designed to load into the top of available memory in RAM 1322 and then back up far enough to meet the needs of the at least one operating system itself. The at least one operating system 1308 then goes to the bottom of the pool of RAM 1322 and starts building up with the various driver software required to control the hardware subsystems of the host computer 1302. After getting the at least one operating system 1308 completely loaded, the remaining RAM 1322 will be ready for application processes. If the application space is filled, the unused information in RAM 1322 will be temporarily moved into a virtual memory 1324 in the hard disk.

Consider a first prior art approach wherein the hardware profile 1314 is stored in the removable medium drive 1304, which is generated during the installation of the operating system 1308 based on the peripheral devices in the host computer 1302. The hardware profile will be loaded into RAM 1322 during booting to allow the loaded system to operate the host computer 1302 and its peripheral devices. Because of the strong binding between the portable apparatus and the host computer 1302, the first prior art approach can only provide a limited portability among host computers 1302 with similar hardware configurations. This approach is similar to the one taught by Meyer et al in U.S. Pat. No. 6,170,055 and the one taught by Suzuki in U.S. Pat. No. 6,601,139.

Consider a second prior art approach. The removable medium drive 1304 has an installed operating system with a first hardware profile stored in its disk storage 1312 based on a first host computer. The second host computer also has a hardware profile 1314 stored in its disk storage 1326. In the second prior art approach, an update procedure is performed to copy or impress the hardware profile 1314 in 1326 through the connection 1316 into the storage disk 1312. The updated apparatus can now boot the second host computer as the procedure introduced in the first prior art approach. The updated apparatus may still be able to boot the first host computer if there is no driver conflict. A possible driver conflict mentioned earlier is the different parameter settings for wireless access points. In that case, the update procedure needs to be performed again before booting the first host computer. The second prior art approach is similar to the one taught by Malik in U.S. Pat. No. 6,718,463 and the one taught by Gere in U.S. Pub. No. 2004/0019778.

The portable apparatus in the second prior art approach may only be suitable for operating a small set of host computers, e.g., a home computer and a computer at work. For operating public host computers, the update procedure may always be needed. Since the speed for transmitting information through the connection 1316 and read/write speed of the removable medium drive 1304 may be ten times slower than the internal communication and read/write speed of the disk storage 1326 in the host computer, to perform the update procedure before every boot sequence may not be desirable.

An embodiment according to the current invention includes incorporating the hardware profile while the host computer loads the at least one operating system as described in the aforementioned example. In particular, the hardware profile 1314 will be stored in the host computer 1302. In one embodiment, a script or a program will be invoked during the boot sequence, which will search for a designated location in the disk storage of the host computer for the hardware profile. The found hardware profile will be loaded into RAM 1322 directly. In another embodiment, the found hardware profile may be mounted into the loaded at least one operating system and links or shortcuts may be created in the loaded at least one operating system to incorporate the hardware information of the host computer. Compared with the prior art approaches introduced previously, these embodiments will avoid the read/write of the hardware profile 1314 in the removable medium drive 1304 through the connection 1316.

To further avoid reading information from the removable medium drive, an operating system 1328 may also be stored in the disk storage 1326 associated with the host computer 1302. During loading the at least one operating system 1308 from the removable medium drive into the memory of the host computer the loaded at least one operating system 1308 may also incorporate certain libraries, programs, and/or files from the stored operating system 1328 into the memory of the host computer. However, incorporation of information in the host computer into the loaded operating system 1308 without verification may not be desirable especially when using the portable apparatus in a public host computer since a modified program or library may record some valuable information in the portable apparatus without notice. A verification procedure to check the release number, the release date, the module size, the module checksum, and/or other signatures in the modules stored in the disk storage of the host computer may be needed. After the verification, the compatible modules of the operating system 1328 stored in the host computer will be loaded into the memory of the host computer; otherwise, the modules of the operating system 1328 stored in the portable apparatus will be loaded into the memory of the host computer. Examples of the modules are 8514SYS.FON and VGASYS.FON for system fonts or GDI32.DLL for the graphics device library.

A portable apparatus in accordance with the present invention comprises a removable data storage medium and at least one operating system on the data storage medium. When the removable data storage medium is operatively connected to a host computer, the at least one operating system in the removable data storage medium will be loaded into the host computer and the loaded at least one operating system will operate the host computer. The portability of the portable apparatus in the instant invention not only means the physical mobility of the removable device but also means the adaptation of the system to operate the host computers with different hardware configurations. For each host computer, when the at least one operating system is loaded, a hardware profile stored in the host computer is incorporated into the loaded operating system. The hardware profile will provide necessary information for the loaded at least one operating system to fully operate the host computer and its peripheral devices. The dynamic incorporation of the hardware profile provides the portability for a portable apparatus to operate host computers with different hardware configurations. The portable apparatus in the instant invention is not the same as a laptop computer, which is also portable and has a data storage medium. More specifically, the difference is that a portable apparatus in the instant invention is detachable from its host computer, which comprises microprocessor and memory, and other hardware peripherals such as keyboard, display, and mouse. However, this specification does not restrict portable devices, such as PDA, MP3 player, or even a laptop computer, from being configured as a portable apparatus to operate the host computers.

Recently, a variety of USB drives such as external hard drives and flash memory drives provide a trend for plug-and-play storage devices. Intel also offers boot-to-USB capability. In particular, the article, "Intel Offers Boot-to-USB in Desktop Boards" written by Ragland et al. published in Intel Developer Update Magazine May 2001, explains the technical details about the boot-to-USB functionality. In one embodiment of the current invention, the host computer may dynamically detect the existence of the removable data storage medium of the portable apparatus and automatically launch the boot process after detecting the portable apparatus.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the invention has applicability well beyond such embodiment, which can be appreciated by those skilled in the art. Accordingly, the scope of the present invention is defined by the appended claims rather than the forgoing description of embodiments.

What is claimed is:

1. An apparatus for operating a host computer in a computer network from a portable data storage medium containing a portable operating system, the apparatus comprising:
   a first set of instructions in the portable operating system in the portable data storage medium operatively connected to the host computer, wherein the first set of instructions can generate an operating environment for the host computer by utilizing a hardware profile stored inside the host computer or accessible by the host computer in the computer network and wherein the hardware profile is neither transferred nor impressed onto the portable operating system in the portable data storage medium; and
   the hardware profile containing hardware device and characteristic information, wherein the first set of instructions in the portable operating system on the portable data storage medium can access a designated location in the computer network or in the host computer to access the hardware profile and wherein the hardware profile is neither transferred nor impressed onto the portable operating system in the portable data storage medium.

2. The apparatus of claim 1, wherein the hardware profile is operatively connected to the computer network using a dynamic host configuration protocol (DHCP) and the host computer is configured to access the hardware profile via the computer network.

3. The apparatus of claim 1, wherein the hardware profile incorporates network configuration parameters used by the first set of instructions to enable the computer network to recognize the host computer.

4. The apparatus of claim 1, wherein the hardware profile stored inside the host computer means that the hardware profile is stored in a data storage medium inside the host computer, and wherein the hardware profile accessible by the host computer in the computer network means that a separate network-attached device in the computer network is providing access of the hardware profile to the host computer.

5. The apparatus of claim 1, wherein the portable data storage medium further comprises a logic block or a stored software configured to provide a data access authentication.

6. The apparatus of claim 1, wherein the portable data storage medium further comprises a communication interface which may be based on FireWire, USB, SCSI, RS-232, PCMCIA, PS/2, EPP, ECP, Ethernet, Gigabit Ethernet, 802.11a, 802.11b, 802.11g, Bluetooth, and/or CDPD.

7. A data processing system comprising:
   a computer network containing a plurality of host computers, wherein each host computer has a microprocessor and a memory block;
   one or more portable apparatuses operatively connected to the computer network, wherein each portable apparatus comprises a removable data storage medium, a communication means to establish an operative connection to the computer network, and a portable operating system installed on the removable data storage medium for loading into at least one of the plurality of host computers;
   a means for selecting and identifying a particular removable storage medium from the one or more portable apparatuses as a boot disk for a particular host computer among the plurality of host computers in the computer network;
   an input/output means for loading the portable operating system or for selecting and loading the portable operating system from the particular removable storage medium to the particular host computer;
   a hardware profile stored inside the particular host computer and/or operatively connected to the computer network, wherein the hardware profile contains hardware device and characteristics information of the particular host computer; and
   a means for allowing the portable operating system to access a designated location of the hardware profile in the computer network or in the particular host computer, wherein the hardware profile is neither transferred nor impressed onto the one or more portable apparatuses, and wherein accessing the designated location of the hardware profile by the portable operating system is part of generating an operating environment.

8. The data processing system of claim 7, wherein at least one of the plurality of host computers is configured to function as a managing server for the computer network.

9. The data processing system of claim 7, wherein the hardware profile is operatively connected to the computer network using a dynamic host configuration protocol (DHCP) and the particular host computer among the plurality of host computers is configured to access the hardware profile via the computer network.

10. The data processing system of claim 7, wherein the hardware profile incorporates network configuration parameters used by the operating environment to enable the computer network to recognize the particular host computer.

11. The data processing system of claim 7, wherein the hardware profile further contains information related to configuration, initialization, and registries of the plurality of host computers and/or other devices operatively connected to the computer network.

12. The data processing system of claim 7, wherein the input/output means is configured to load the portable operating system into the memory block of the particular host computer.

13. The data processing system of claim 7, wherein the hardware profile further comprises a privileges profile specifying access privileges for the one or more portable apparatuses to hardware resources in the particular host computer and/or any other device operatively connected to the computer network.

14. The data processing system of claim 7, further comprising a plurality of procedures for operating the data processing system, the plurality of procedures comprising the steps of:
 electing the particular host computer among the plurality of host computers in the computer network to designate the particular host computer for the one or more portable apparatuses;
 selecting and identifying the particular removable storage medium from the one or more portable apparatuses as the boot disk for the particular host computer among the plurality of host computers in the computer network;
 loading the portable operating system from the particular removable storage medium to the particular host computer; and
 incorporating the hardware profile during loading of the portable operating system to generate an operating environment for the particular host computer in the computer network.

15. The data processing system of claim 14, wherein the plurality of procedures for operating the data processing system further comprises a step of detecting connection of the particular removable storage medium in the computer network.

16. The data processing system of claim 14, wherein the plurality of procedures for operating the data processing system further comprises a step of disabling a manual ejection function of the one or more portable apparatuses if the one or more portable apparatuses are directly inserted into one or more docking stations in the computer network.

17. The data processing system of claim 14, wherein the plurality of procedures for operating the data processing system further comprises a step of executing a clean-up procedure to remove unwanted information from the particular host computer in the computer network.

18. The data processing system of claim 14, wherein the plurality of procedures for operating the data processing system further comprises a step of implementing a standby mode to enable a temporary detachment of the one or more portable apparatuses from the particular host computer or from the computer network.

19. A computer-readable portable storage medium containing a portable operating system for booting a host computer in a computer network by the portable operating system, the computer-readable portable storage medium comprising:
 a first set of instructions in the computer-readable portable storage medium configured to make the host computer in the computer network select and identify the computer-readable portable storage medium as a boot disk for the host computer;
 a second set of instructions in the computer-readable portable storage medium configured to load the portable operating system into the host computer in the computer network to generate an operating environment while accessing an hardware profile of the host computer loaded in the host computer by the host computer, wherein the hardware profile contains hardware device and characteristic information of the host computer, and wherein the hardware profile resides in a separate data storage medium operatively connected to the host computer, and wherein the hardware profile is neither transferred nor impressed onto the computer-readable portable storage medium; and
 a third set of instructions in the computer-readable portable storage medium configured to access and utilize the hardware profile in the separate data storage medium operatively connected to the host computer to manage the operating environment provided by the portable operating system, wherein the hardware profile is neither transferred nor impressed onto the computer-readable portable storage medium from the host computer.

20. The computer-readable portable storage medium of claim 19, further comprising a fourth set of instructions for detecting connection status of the computer-readable portable storage medium with the host computer in the computer network.

* * * * *